United States Patent [19]

Schiefer et al.

[11] 4,193,246

[45] Mar. 18, 1980

[54] CLAMPING MEMBER FOR AN ADHESIVELY SECURED ANCHOR ROD

[75] Inventors: Erwin Schiefer; Gusztav Lang, both of München, Fed. Rep. of Germany

[73] Assignee: Hilti Aktiengesellschaft, Schaan, Liechtenstein

[21] Appl. No.: 925,859

[22] Filed: Jul. 18, 1978

[30] Foreign Application Priority Data

Jul. 21, 1977 [DE] Fed. Rep. of Germany ....... 2733007

[51] Int. Cl.² ............................................. F16B 13/04
[52] U.S. Cl. .......................................... 52/698; 85/79
[58] Field of Search ......................... 52/698, 155, 160; 405/259, 260, 261; 85/79, 80, 81, 69, 58; 248/412; 294/86.25, 94, 95, 96

[56] References Cited

U.S. PATENT DOCUMENTS

| | | | |
|---|---|---|---|
| 1,374,510 | 4/1921 | McDowell | 294/86.25 |
| 1,509,565 | 9/1924 | Oswald | 294/86.25 |
| 3,967,525 | 7/1976 | Lerich | 85/79 |

FOREIGN PATENT DOCUMENTS

| | | | |
|---|---|---|---|
| 542902 | 7/1957 | Canada | 405/259 |
| 81638 | 12/1956 | Denmark | 52/698 |
| 1425852 | 2/1972 | United Kingdom | |

*Primary Examiner*—Ernest R. Purser
*Attorney, Agent, or Firm*—Toren, McGeady and Stanger

[57] ABSTRACT

An anchor rod is secured within a bore hole by a hardenable adhesive compound. To hold the anchor rod within the bore hole before the adhesive compound sets, clamping members are provided on the exterior surface of the rod inserted into the borehole. The clamping members include rolling bodies held on a clamping surface on the rod so that a tendency of the rod to be displaced from the bore hole effects a wedging action by the clamping surface forcing the rolling body against the surface of the bore hole. The rolling bodies or balls can be held on the clamping surface by an elastomeric sheathing or springs.

3 Claims, 4 Drawing Figures

CLAMPING MEMBER FOR AN ADHESIVELY SECURED ANCHOR ROD

SUMMARY OF THE INVENTION

The present invention is directed to an anchor rod secured within a prepared bore hole by a hardenable adhesive compound with means on the rear end of the anchor rod for applying a load thereto and, more particularly, it concerns clamping means for holding the anchor rod in the bore hole before the adhesive compound sets.

Compared to grouted anchoring devices, adhesively secured anchor rods are used to an increasing degree because of their advantages, such as, high load carrying capacity, the ability to provide an anchor even when exposed to a vibrating load, stress-free mounting (low spreading pressure), the use of smaller diameter bore holes, and a short setting time. Depending on use, the rear end of an anchor rod, that is, the end which usually extends outwardly from a bore hole, can be provided with a thread for attaching a load. Further, the rear end can have a cross-section greater than that inserted into the bore hole, such as a head, a flange, lug or hook, or the like. However, due to the time required for setting which, though short, does exist, there have been borderline cases where an adhesively secured anchor rod could not be used or could be used only with significant difficulties. The disadvantage involved in the use of such anchor rods is that they cannot be loaded immediately and, for example, where the bore hole is located in an overhead location the rod tends to be pulled out because of its own weight.

To overcome this disadvantage, a plastic sleeve has been used with the anchor rod, with the sleeve having elastically deformable parts which project from the outer surface of the sleeve. The sleeve is placed on the surfaces of the rod. Such a sleeve, however, requires a larger diameter of the bore hole. Moreover, such an arrangement involves a second adhesively secured interface across which the anchoring force must be transmitted. In the event there is a subsequent softening of the adhesive compounds, due to increased temperatures resulting from a fire, the elastic clamping effect does not provide any additional holding action.

Furthermore, it is known to expand such a sleeve by means of an expanding cone on the anchor rod for securing the sleeve in the bore hole. This expanding procedure, however, requires significant forces during the setting of the anchor rod, thus eliminating, to a significant degree, the advantages as compared to an expansion type anchor rod.

The primary object of the present invention is to provide an adhesively secured anchor which, without the application of any additional forces during the setting procedure, facilitates the holding of the anchor rod in the bore hole until the adhesive compound sets or hardens and, moreover, assures a minimum anchoring value or force in case there is a subsequent softening of the adhesive compound.

In accordance with the present invention, the clamping means includes rolling bodies which roll on clamping surfaces formed in recesses on the anchor rod and of elements holding the bodies on such surfaces. The clamping surfaces diverge outwardly toward the maximum diameter circumferential surface of the anchor rod in the direction toward the front end of the rod and, further, the rolling bodies project laterally beyond the maximum diameter circumferential surface of the anchor rod when the rod is inserted into a borehole in the unstressed state. Therefore, the clamping action of the anchor rod is effected based on the principle of rolling friction. As is well known, the efficiency of rolling friction is very high so that a strong clamping action can be afforded in the radial direction by means of small forces acting in axial direction of the rod. Unlike the known clamping means, the clamping means in accordance with the present invention, immediately responds to the application of a load. Moreover, based on the inventive arrangement, the clamping action is proportional to the applied load. Since the clamping surfaces and the rolling bodies are preferably formed of metal, the holding action is afforded by the clamping means in a temperature range which exceeds the temperature range at which the adhesive compounds securing the anchor rod are stable.

In one embodiment of the anchor rod, the clamping surfaces are in the form of frusto-conical surfaces widening in the direction toward the front end of the rod. Accordingly, the anchor rod has an axially symemtrical shape providing a favorable effect on the holding action. When the radius at the rounded off smaller diameter end of the frusto-conical surface, is kept sufficiently large, the resulting notch effect on the anchor rod is low.

To prevent oblique placement of the anchor rod, it is advantageous if several serially arranged frusto-conical surfaces are provided on the portion of the anchor rod inserted into the bore hole. Preferably, the number of such frusto-conical surfaces is determined by the desired load bearing capacity of the anchor rod before the adhesive compound sets.

In another advantageous embodiment of the invention, the clamping surfaces are formed as a portion of the surface of inclined bores which open through the circumferential surface of the anchor rod. For a satisfactory centering of the anchor rod in the bore hole and a uniform distribution of the clamping forces, it is advantageous to arrange three bores angulary spaced apart about the circumference of the rod. To improve the clamping effect, several groups of the bores can be provided with the groups spaced apart in the axial direction of the anchor rod. The bores in adjacent groups can be aligned or angularly offset. To afford an optimum clamping action of the rolling bodies relative to the geometry of the bore hole, it is advantageous if the rolling bodies are formed as balls. Ball-shaped rolling bodies are mass produced for many purposes and are, therefore, available at low cost. There is little in the way of requirements for these rolling bodies with regard to accuracy as to size and quality of surface finish.

To provide an arrangement of the rolling bodies which is as simple as possible, the balls are enclosed within an elastomeric sheathing. The individual balls are advantageously secured within an endless hose-like elastomeric sheathing member forming a ring. Further, the balls can also be embedded directly into an elastomeric ring. When a load is applied, it is possible that the sheathing is displaced and the balls come into direct contact with the clamping surfaces and the surface of the bore hole. In an elastomeric ring the spring suspension of the ring results essentially from its inside diameter being in cooperation with the appropriate outside diameter of the clamping surface.

When a small number of rolling bodies is used, it is advantageous if they are individually spring biased. Such an arrangement can be afforded using spiral springs for holding the rolling bodies against the clamping surfaces. The spiral springs act on the rolling bodies basically in the direction in which the anchor rod is inserted into a bore hole. Such spiral springs result in an immediate clamping when a load is applied to an inserted anchor rod.

The various features of novelty which characterize the invention are pointed out with particularity in the claims annexed to and forming a part of this disclosure. For a better understanding of the invention, its operating advantages and specific objects attained by its use, references should be had to the accompanying drawings and descriptive matter in which there illustrated and described preferred embodiments of the invention.

DETAILED DESCRIPTION OF THE INVENTION

Figure 1:
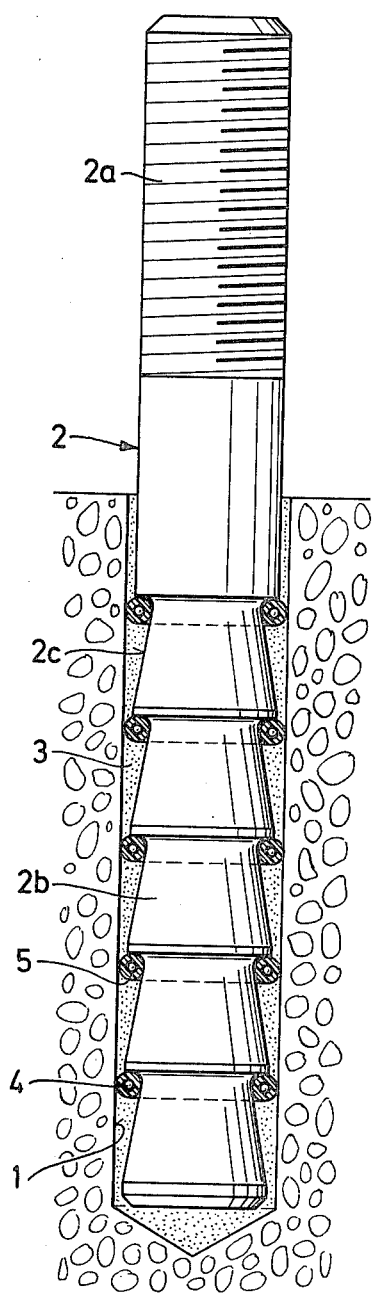
FIG. 1 is a side view of an anchor rod embodying the present invention with frusto-conically shaped clamping surfaces and rolling bodies in the form of balls sheathed by elastomeric rings, with the anchor rod illustrated before a load is applied to it.

In FIG. 1 an anchor rod 2 is shown inserted into a bore hole 1. In the description, the front end of the anchor rod is the end first inserted into the bore hole, that is, the lower end as viewed in FIG. 1, and its rear end is the upper end projecting outwardly from the bore hole. At its rear end, the anchor rod 2 has a thread 2a by which a load can be applied to the rod. An axially extending portion of the anchor rod 2 extending from its front end consists of a number of serially arranged frusto-conical parts or members 2b one following the other. The larger diameter end of each frusto-conical part is closer to the front end of the anchor rod while its smaller diameter end is closer to the rear end. The circumferentially extending outside surface of the frusto-conical members 2b each provide a clamping surface 2c inclined inwardly from the maximum diameter circumferential surface of the rod toward the rear end of the rod. Each of the frusto-conical surfaces 2c is inclined at an acute angle relative to the axis of the anchor rod. As shown, the space between the wall of the bore hole and the anchor rod is filled with a hardenable adhesive compound 3. In effect, each frusto-conical member 2b forms an annular recess relative to the maximum diameter circumferential surface of the rod and a number of balls 4 are arranged in each of these recesses. The balls 4 serve as rolling bodies and provide a clamping effect on the anchor rod 2 in the bore hole 1. Each of balls 4 surrounding one of the frusto-conical members 2b is enclosed by an elastomeric sheathing 5. The elastomeric sheathing 5 is in the form of an annular or ring member and maintains the balls 4 in continuous contact with the wall of the bore hole. The anchor rod 2 is shown in FIG. 1 before any load is applied to it.

Figure 2:
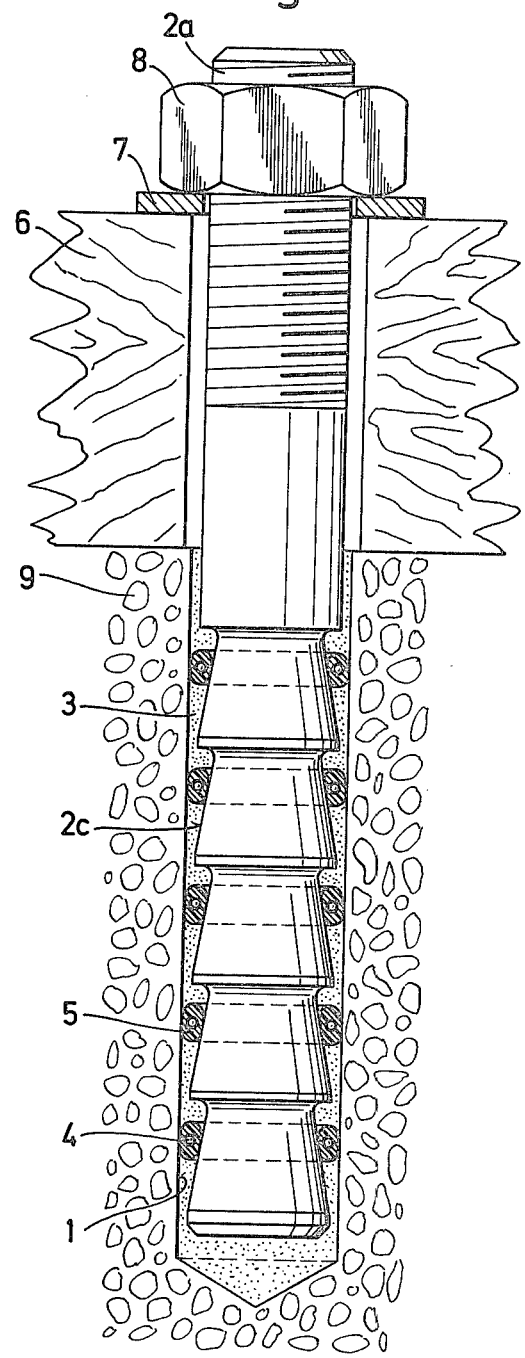
FIG. 2 is a view similar to FIG. 1, however, showing a load applied to the rear end of the anchor rod.

In FIG. 2 the anchor rod of FIG. 1 is illustrated with a load applied. A beam 6 is shown being held in position by the anchor rod 2. The beam 6 is fastened against the receiving material 9 into which the bore hole 1 is formed, by means of a washer 7 and a nut 8 screwed onto the thread 2a on the rear end of the anchor rod. During tightening, the anchor rod is pulled in the axial direction for a certain distance out of the bore hole 1. The balls 4, however, have remained in essentially the same plane so that a clamping effect results by the wedging action afforded by the clamping surfaces 2c of the frusto-conical members 2b and the juxtaposed wall of the bore hole. The clamping is proportional to the load applied to the anchor rod. As a result of the clamping action, that is, as a load applied to the rod displaces it axially out of the bore hole, the clamping surface 2c effects a wedging action against the rolling bodies forcing them radially outwardly against the bore hole surface. As a result of the clamping action, the ring-like elastomeric sheathing 5 enclosing the balls 4 is deformed. Accordingly, the elastomeric sheathing 5 serves simultaneously as an element holding the balls and also affords a seal preventing the unhardened adhesive compound 3 from falling out of the bore hole 1. When the load is applied to the anchor rod, the elastomeric sheathing may be deformed to such a degree that the balls come into direct contact with at least one of the clamping surface 2c and the wall of the bore 1. After the adhesive compound 3 has hardened or set, the major portion of the anchoring action is provided by the adhesive compound. In the event of a subsequent softening of the adhesive compound 3, the balls 4 in cooperation with the clamping surfaces 2c and the surface of the bore hole provide a certain minimum anchoring component.

Figure 3:
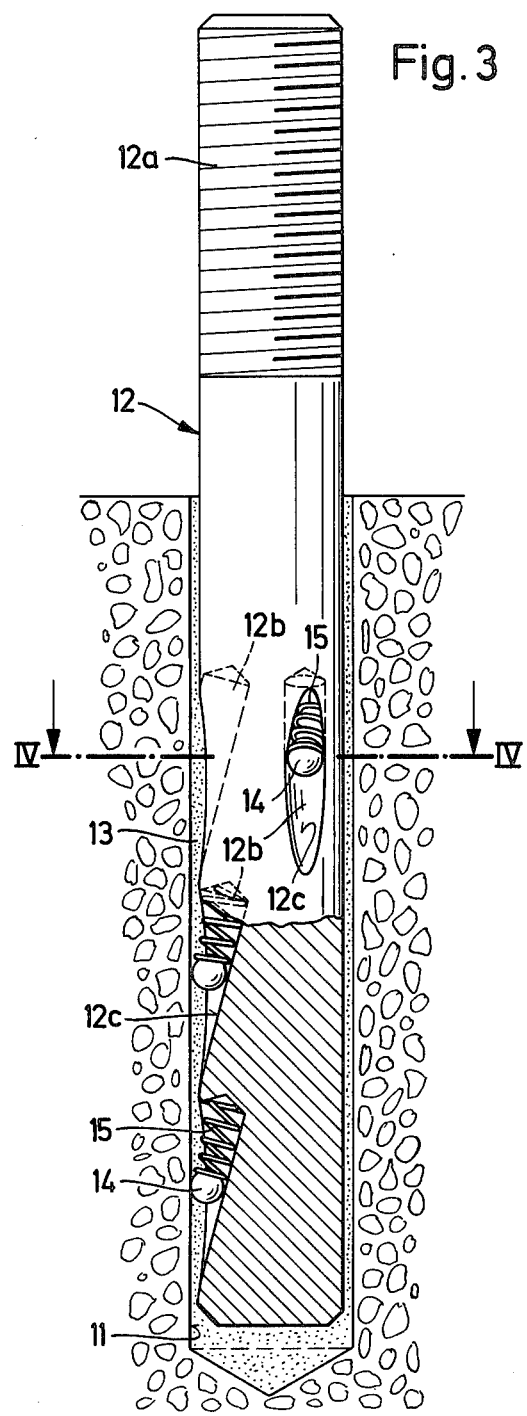
FIG. 3 is a side view of another embodiment of the present invention with the anchor rod incorporating individual spring biased rolling bodies.

FIG. 3 illustrates another embodiment of an anchor rod 12 incorporating the present invention. The rear end of the anchor rod has a thread 12a for securing a load to the rod. The portion of the anchor rod located within the bore hole has a number of bores 12b inclined relative to the axis of the anchor rod and open through the maximum diameter circumferential surface of the rod. The bores are inclined outwardly away from the rod axis in the direction toward the front end of the rod. An adhesive compound 13 is filled into the annular space between the borehole 11 and the circumferential surface of the anchor rod 12. Positioned within each of the bores 12b is a ball 14 serving as a rolling body and biased toward the front end of the rod by a spiral spring 15. The spiral spring 15 is seated against the inner end of the bore and biases it in the direction of the front end of the anchor rod and also outwardly toward the juxtaposed surface of the bore hole 11. The wall 12c of each bore 12b serves as a clamping surface 12c. When the anchor rod is inserted into the bore hole 11, the balls 14 are pressed into the bores 12b against the biasing action of the spiral springs 15. When a load is applied to the anchor rod 12 pulling it out of the bore hole, the balls 14 are clamped or wedged between the clamping surfaces 12c and the surface of the bore hole 11. Accordingly, the anchor rod can be mechanically clamped into the bore hole 11 before the adhesive compound 13 has set.

Figure 4:
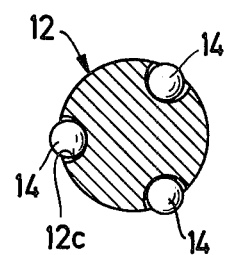
FIG. 4 is a sectional view taken along line IV—IV in FIG. 3.

In FIG. 4 a cross-sectional view is shown through the anchor rod 12 taken along the line IV—IV in FIG. 3. As this cross-sectional view illustrates, at the outer circumference of the anchor rod there are three clamping surfaces 12c each arranged with a corresponding ball 14. Accordingly, a three-point contact is provided with the bore hole 11 so that the anchor rod 12 is centered within the bore hole. In FIG. 3 three groups of bores 12b are illustrated. The groups are spaced part in the axial direction of the rod and the bores in adjoining groups can be aligned or angularly offset relative to one another. Where the bores 12b are angularly offset in adjacent groups, the balls in adjacent groups may be more closely spaced.

While specific embodiments of the invention have been shown and described in detail to illustrate the application of the inventive principles, it will be understood that the invention may be embodied otherwise without departing from such principles.

What is claimed is:

1. Anchor rod to be secured in a bore hole or similar recess by means of a hardenable adhesive compound, said anchor rod comprising an axially extending rod having a front end inserted first into the bore hole and a rear end, at least an axial portion of said anchor rod having a maximum diameter circumferential surface thereon extending from the front end toward the rear end and arranged to be inserted into the bore hole, means arranged at the rear end of said rod rearwardly of said axial portion for connecting a load to the rod, and clamping means positioned on said axial portion of said rod insertable into the bore hole for retaining the rod within the bore hole before the adhesive compound sets wherein the improvement comprises that said axial portion of said anchoring rod includes clamping surfaces inclined at an angle to the axis of said rod with the clamping surface diverging outwardly from the axis in the direction toward the front end of said rod, said clamping surface diverging outwardly from a location inwardly of the maximum diameter circumferential surface of said rod to the maximum diameter circumferential surface thereof, said clamping surface comprises at least one frusto-conical surface encircling the axis of said rod with the smaller diameter end thereof being closer to the rear end of said rod and the larger diameter end being closer to the front end of said rod, said clamping means includes rolling bodies rollable on said clamping surface and elements in contact with said rolling bodies and holding the rolling bodies on the clamping surface, and the combination of said rolling bodies and elements projects outwardly beyond the maximum diameter circumferential surface of said axial part of said rod before any load can be applied, said rolling bodies are balls and said element is an annular elastomeric sheathing holding said balls therein with said sheathing completely encircling said clamping surface and arranged to maintain said balls in continuous contact with the wall of said bore hole, and before any load is applied said sheathing and balls are located at the smaller diameter end of said clamping surface.

2. Anchor rod, as set forth in claim 1, wherein a plurality of serially arranged said frusto-conical surfaces are disposed in the axial direction of said anchor rod.

3. Anchor rod, as set forth in claim 1, wherein when said rod is inserted into a bore hole said annular elastomeric sheathing has a radially inner diameter in contact with the clamping surface on said anchor rod and a radially outer diameter in contact with the surface of the bore hole.

* * * * *